June 13, 1939.  G. L. WINGFIELD  2,161,789
ANIMAL TRAP
Filed June 26, 1937  3 Sheets-Sheet 1
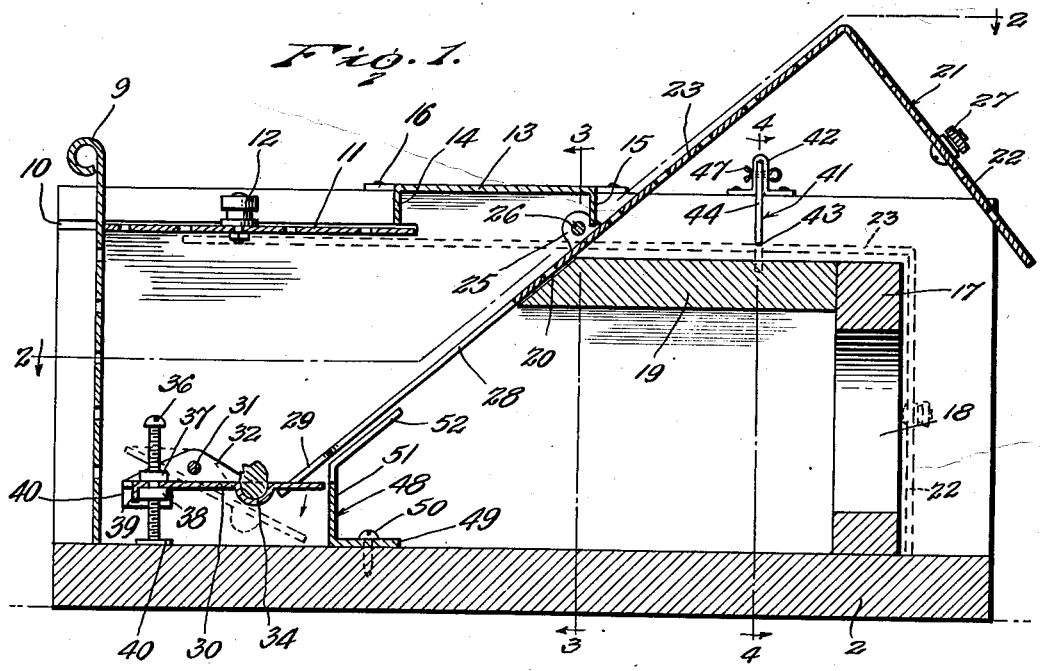
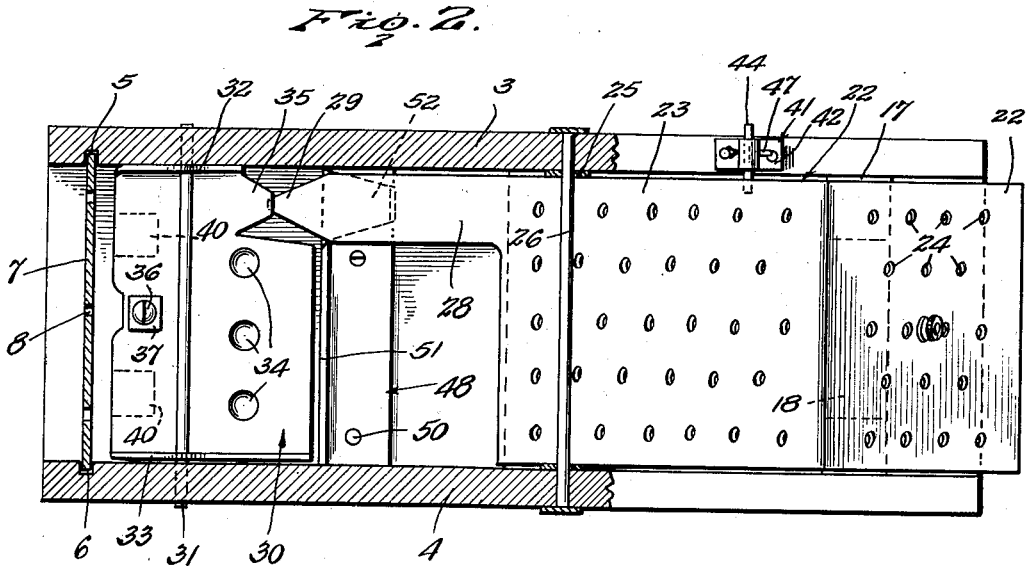
Inventor
Grover L. Wingfield.
By Lacy & Lacy, Attorneys June 13, 1939.　　　G. L. WINGFIELD　　　2,161,789
ANIMAL TRAP
Filed June 26, 1937　　　3 Sheets-Sheet 2

Inventor
Grover L. Wingfield.
By Lacy & Lacy, Attorneys

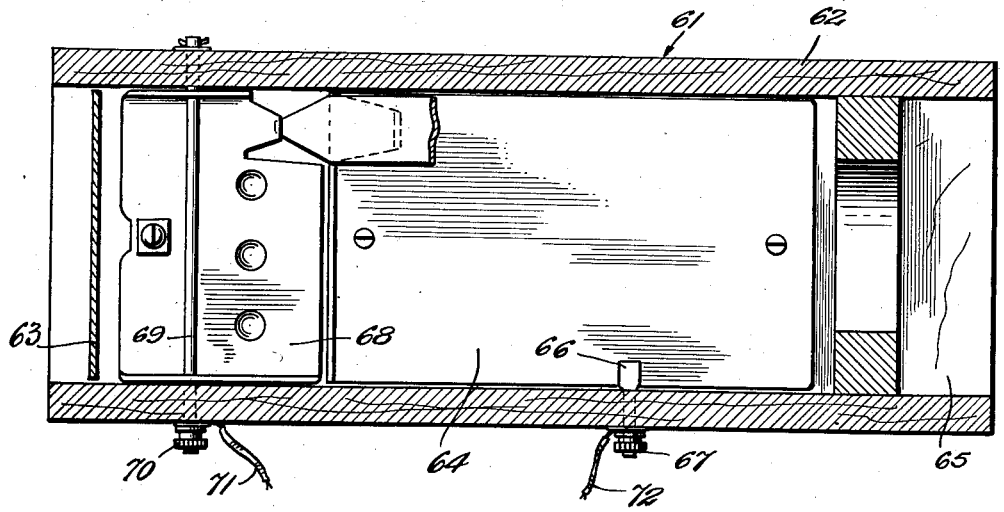
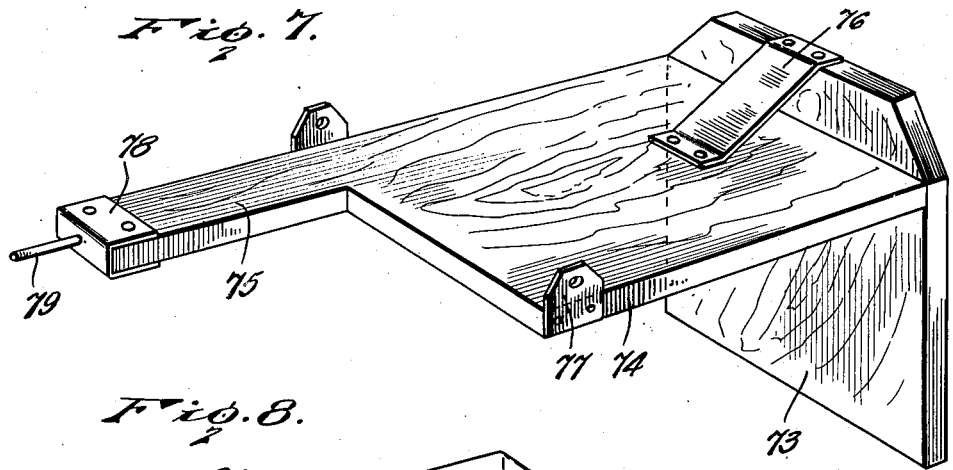
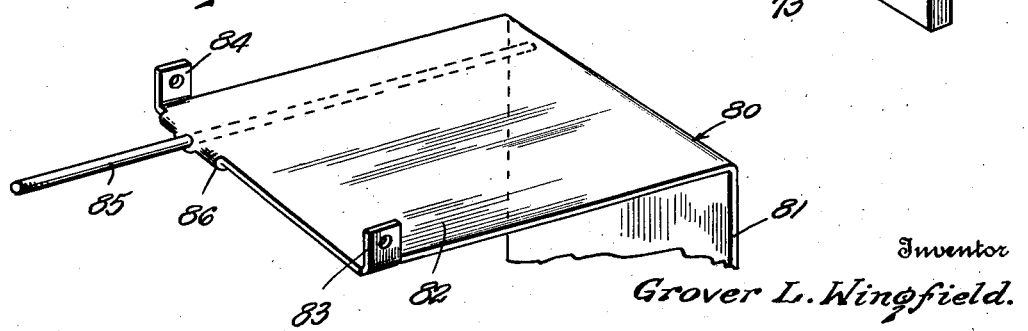

Patented June 13, 1939

2,161,789

UNITED STATES PATENT OFFICE 2,161,789

ANIMAL TRAP

Grover L. Wingfield, Sandstone, W. Va.

Application June 26, 1937, Serial No. 150,639

6 Claims. (Cl. 43—61)

This invention relates to an improved animal trap.

One object of the invention is to provide an animal trap which will be automatic in operation and which will not require the use of springs for its proper operation.

Another object of the invention is to provide an animal trap which will be positive in operation and which will permit the preservation of the animal in a live state should it be desired to do so, the animal being definitely prevented from escaping from the trap and yet, at the same time, being protected from injury.

A further object of the invention is to provide a device of this character which, in one of its embodiments, may be connected in a electric circuit for permitting electrocution of rodents or other animals in the trap upon their closing the electric circuit with their bodies within the trap.

Another object of the invention is to provide a trap which may be made of any suitable material such as wood, sheet metal, glass, etc., which may be made in various sizes, and which will be highly efficient in use.

The invention seeks as a still further object to provide an animal trap wherein means are provided for permitting the removal, with utmost facility, of live or dead animals caught in the trap.

Other and incidental objects of the invention not specifically mentioned in the foregoing, will render themselves apparent as the description of the invention proceeds.

My invention is illustrated in the accompanying drawings, wherein:

Figure 1 is a longitudinal sectional view of my improved trap.

Figure 2 is a horizontal sectional view on the line 2—2 of Figure 1, looking in the direction indicated by the arrows.

Figure 6 is a horizontal sectional view showing a slightly modified form of my invention.

Figure 7 is an enlarged perspective view showing a modified form of the trap door employed.

Figure 8 is an enlarged fragmentary perspective view showing a still further modified form of trap door.

Figure 3:
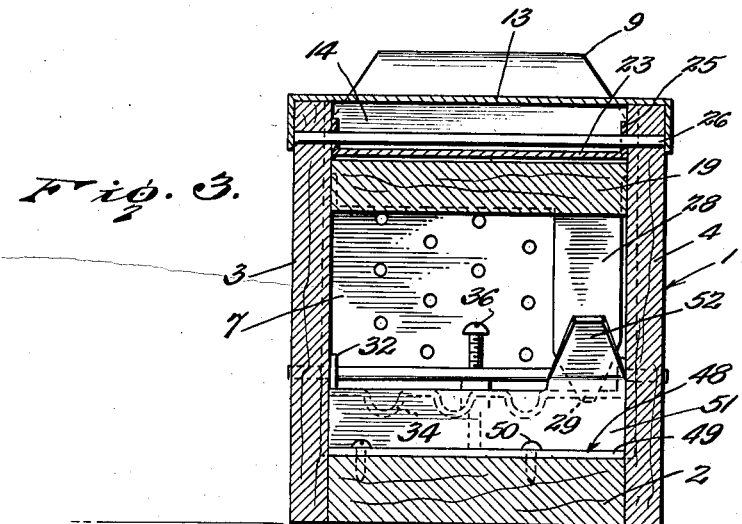
Figure 3 is a vertical sectional view on the line 3—3 of Figure 1.

Referring now more particularly to the drawings, wherein, as will be seen, like numerals of reference designate similar parts throughout the various views, the numeral 1 indicates the casing or body of my improved animal trap. The body includes a relatively thick bottom wall or base 2 and side walls 3 and 4 rising from each side thereof. The side walls are provided near corresponding ends with vertically disposed grooves 5 and 6 which extend throughout the major portion of the length of the side walls 3 and 4. The grooves 5 and 6 are adapted to receive a removable end wall 7 which is preferably formed of sheet metal and provided with ventilating apertures 8. The end wall 7 is tapered in width at its upper end and is rolled to define a handle or grip portion 9. Lateral grooves 10 are formed in the side walls 3 and 4 and lead from the ends of said side walls inwardly a distance substantially two-fifths of the length of the casing. The grooves 10 intersect at right angles the vertical grooves 5 and 6 near the free edges of the end walls 3 and 4.

The walls of the casing 1 may be formed of wood or other suitable material, or a combination of wood and other material. The casing is provided with a slidable top wall or plate 11 slidable within the grooves 10 and is held in place in the grooves by means of the end wall 7, when said end wall is in place. A knob 12 is applied to the top plate 11 and permits ready removal of the top plate after the end wall 7 has been withdrawn. A center top section 13, preferably of sheet metal, is carried by the casing 1 and is provided with depending flanges 14 and 15 which are formed by cutting and pressing downwardly side portions of the section 13. The flanges 14 and 15 define ears 16 which are secured to the upper edges of the walls 3 and 4 and serve to retain the section 13 in place.

The casing 1 is provided, at its end opposite the end wall 7, with an end wall 17 preferably formed of wood and substantially rectangular in shape. The wall 17 is of substantially the same thickness as the bottom wall 2 and is provided with a circular opening 18 adapted to permit the entrance of an animal to be caught while the trap door to be hereinafter described is in raised position. A top wall portion 19 is secured to the wall 17 and extends rearwardly therefrom to a point under the top center section 13. The portion 19 is provided with an inclined wall 20 at its inner end. It will be seen that the end wall 17 terminates short of the top of the walls 3 and 4 and also short of the horizontal plane in which the top plate 11 lies, so that the upper surface of the wall portion 19 lies beneath the horizontal plane of the top plate 11.

In order to entrap an animal within the casing after it has passed through the door 18 in the end wall 17, I provide a trap door 21 which has an end section 22 and a top section 23. As will be seen by referring particularly to Figures 1 and 2 of the drawings, the sections 22 and 23 of the trap door are provided with a plurality of ventilating openings 24 which will permit ventilation of the interior of the casing. In other words, it may be stated that the trap door is preferably formed of foraminous sheet metal. The sections 22 and 23 are disposed at right angles to each other and the section 23 is provided near its inner end with a pair of integral oppositely disposed upturned ears 25. The ears are adapted to receive a hinge rod 26 which extends across the casing 1 medially of its length and near the corresponding upper edges of the walls 3 and 4. Moreover, the rod 26 is disposed in close spaced relation to the lower edge of the flange 15. As seen in Figure 1, when the trap door is disposed in open position, the inner end portion of the section 23 will lie adjacent the inclined wall 20 of the wall section 19. The hinge rod 26 serves to hingedly connect the trap door with the casing and permit raising and lowering of the trap door. For ready manual engagement, a knob 27 is provided on the section 22. The wall section 23 is projected, as best seen in Figure 2, at one side of its inner end portion, to define an arm 28 having a tapered detent 29 formed on its free end.

The numeral 30 indicates a trigger plate carried on the trigger rod 31 near the bottom wall 2 of the casing and near the end wall 7. The trigger rod extends through upturned flanges 32 and 33 which are formed on the trigger plate 30 at its opposite ends. The trigger plate is pressed at points on its width to define bait receiving recesses 34. The plate is cut back at a point near one of its ends and cut to form a trigger 35 which is adapted to engage over the extreme lower end portion of the detent 29 for retaining the trap door in raised or set position in a manner to be described in more detail hereinafter. An adjusting bolt 36 is carried at the rear of the trigger plate 30 medially of its width and is adapted to be held in a set position by means of lock nuts 37 and 38. The lock nut 38 is held against turning movement by means of a downturned tongue 39 struck from the edge of the plate 30. The lower end of the bolt 36 engages a metal stud 40 and provides a firm engaging surface for the bolt. As shown at 40, the trigger plate is provided with a weight which will serve to rock the trigger plate rearwardly so that the forward end thereof will be normally held in upward position. The downward swinging of the trigger plate which would be caused by the weight is limited by the adjusting bolt 36. It should be understood that in lieu of the rods 26 and 31, which extend transversely of the casing, studs, rivets or screws may be employed for pivotally mounting the plate and trap door 21 in place.

Figure 4:
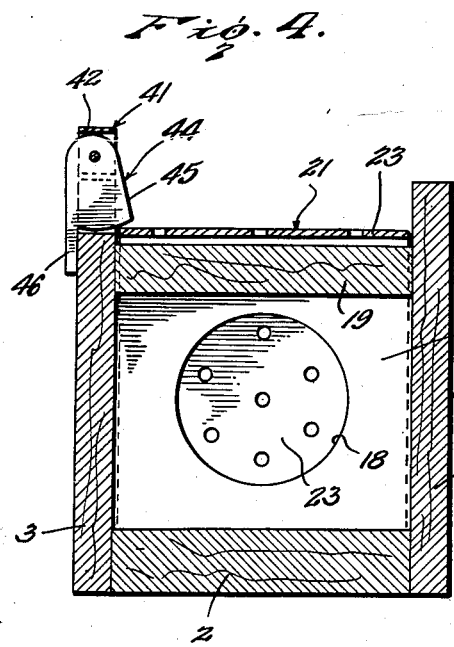
Figure 4 is a vertical sectional view on the line 4—4 of Figure 1, looking in the direction indicated by the arrows.

There is carried on the upper surface of the wall 4, at a point overlying the section 23 of the trap door 21, a latch indicated in general by the numeral 41. The latch includes a mounting yoke 42 which overlies the slot 43 which is cut in the edge of the wall 4. The mounting yoke 42 is of substantially inverted U-shape and is formed from a single piece of bent sheet metal. A latch member 44 is carried by the yoke and is provided with an inclined surface 45, best seen in Figure 4. The latch member 44 is formed with a depending finger lug 46 which, as will be seen, normally lies against the outer surface of the wall 4 so that when the trap door has fallen for imprisoning an animal within the trap, possibility of upward movement of the door will be prevented. As the trap door 21 swings downwardly to entrapping position, one edge of the top section 23 will ride on the inclined wall 45 and will thus shift the latch member 44 outward. When the edge of the section 23 clears the lower end of the wall 45, as shown in Figure 1 of the drawings, the latch member will swing inwardly until the finger lug 46 engages the outer surface of the side wall 3. The lower end of the latch member will, of course, overhang a portion of the upper surface of the section 23 and prevent raising of said section. The finger lug 46 may be shifted outwardly for freeing the trap door and permitting lifting thereof when it is desired to reset the trap. A cotter key 47 pivotally mounts the latch member 44 in the mounting yoke 42.

A guard plate 48 is carried in the casing on the bottom wall thereof and extends throughout the entire width of said bottom wall. Said guard plate has a base portion 49 which is attached to the bottom wall 2 forwardly of the trigger plate 30 by means of screws 50 or in any other appropriate manner. The guard plate has, at one end thereof, a vertical portion 51 which terminates in a upwardly inclined portion 52. The upwardly inclined portion is adapted to engage the lower end portion of the trigger arm 28 and cooperates with the surface 20 for preventing too great downwardly swinging movement of the trigger arm. Moreover, the vertical portion 51 will prevent the animal within the trap from inserting its nose beneath the trigger instead of on top thereof.

Although it is believed that, from the foregoing, the construction and operation of my invention will be clearly undesrtood, a few remarks as to the operation are not thought to be out of place. Bait is first placed in the recesses 34 and the trap is then set by raising the trap door 21 so that the arm 28 will be swung downwardly and the detent 29 engaged under the trigger 35. The bolt 36 may be shifted for regulating the amount of tension required to release the detent. In other words, it may be desired to render the trap non-responsive to any but a strong depressive effort on the trigger plate so that unwanted animals having a light touch will not set off the trap. On the other hand, the bolt may be regulated for causing the trigger to respond to the slightest depressive effort on the trigger plate. After the animal has released the trap door, it will be effectually imprisoned in the trap and will be prevented from escaping therefrom by the section 22 of the trap door and also by the end wall 7 and top plate 11. Removal of the end wall 7 will permit access to the trap so that the animal may be released.

Figure 5:
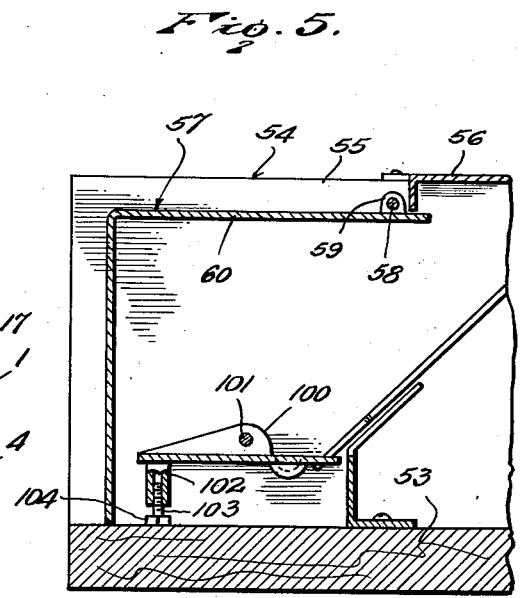
Figure 5 is a vertical detail sectional view showing a combined hinged rear and top wall construction which is a modified embodiment of my invention.

Referring to the modification of the invention disclosed in Figure 5 of the drawings, the numeral 53 indicates the bottom wall of a casing 54 which has side walls 55. A top center section 56 is provided and, in lieu of the top plate 11 and end wall 7, I provide in this embodiment of the invention, an inverted L-shaped swinging door 57 which is hingedly mounted on a rod 58 extending transversely of the casing and through ears 59 formed integrally on the inner end portion of the upper section 60 of the door 57. In order to open the trap and release an animal imprisoned therein, it is only necessary to raise the door 57.

In Figure 5 also will be seen a modified construction of trigger plate which is shown at 100. The plate is mounted on a rod or stud 101 and is provided at its free edge portion with a depending internally threaded sleeve 102. An upwardly extending bolt 103 is carried in the sleeve and is provided with a squared head 104 adapted to be engaged by a wrench. Rotation of the bolt 103 in the sleeve 102 will cause raising and lowering of the trigger plate from beneath its lower edge instead of from the top as in the preferred form. It should be understood that, if desired, both the adjusting bolts 36 and 103 may be employed on one trigger plate so that the plate may be adjusted from either the top or bottom side thereof.

In the modification shown in Figure 6 of the drawings, the numeral 61 indicates a casing of identical construction with that of the preferred form. The casing includes side walls 62 and an end door 63. A metal plate 64 overlies the bottom wall 65 of the casing and is provided with a binding post 66 extending through one of the walls 62 and provided with an attaching nut 67. The trigger plate is of similar construction to the preferred form of the invention and is shown at 68. The trigger plate is mounted on a rod 69 which is threaded at its outer end to receive a binding nut 70. The nuts 67 and 70 are adapted to receive wires 71 and 72 which are intended to be connected in an electric circuit so that the trap will be electrified for electrocuting an animal therein as soon as the animal presses its nose on the trigger plate 68. In other words, electric current will flow from one terminal of a current source through the plate 64, through the animal, and back to the trigger plate. From the trigger plate the circuit will, of course, be completed to the other side of the current source so that the animal will be killed or stunned by electric current. This form of the invention will operate in a manner identical with that of the preferred form, either with or without the electrical connection.

In the modification of the invention shown in Figs. 7 and 8, I provide trap doors of slightly different construction. In Figure 7, there is shown a trap door which is preferably formed of wood and which includes an end plate 73 and a top plate 74 which is provided with an arm 75. The plate 73 is glued or otherwise secured to the plate 74 and is reinforced by means of an offset strap 76. Ears 77 are fastened to the inner ends of the plate 74 at opposite sides thereof and are adapted to receive a rod similar to the rod 26 of the preferred form of the invention. An end clip 78 surrounds the free end of the trigger arm 75 and said clip carries a detent 79 which may be formed of wire or other suitable material. If desired, this trap door may be substituted for the trap door 21.

In Figure 8 of the drawings, a trap door of sheet metal is shown. The trap door is indicated by the numeral 80 and is formed of a single piece of sheet metal bent to substantially inverted L-shape. The door 80 includes a door portion 81 and a top portion 82 having ears 83 and 84 at its free end. The ears 83 and 84 are adapted to receive a rod similar to the rod 26 for effectually mounting the trap door in the casing. A detent rod 85 is carried by the top portion 82 and extends throughout its length at its under side. The inner end of the detent rod 85 is secured in the door 81 at its upper extremity and the forward edge of the top portion 82 is formed with an apertured ear 86 which receives the rod 85 therethrough and provides a central bracing medium therefor. This form of the trap door may be employed in lieu of any of the other forms hereinbefore described.

It is believed that the construction and operation of my improved trap will now be thoroughly understood from the foregoing description.

Having thus described the invention, what I claim is:

1. In an animal trap, a casing having a bottom wall and side walls, said side walls having grooves, an end wall adapted for closing the casing at one end and being slidable in certain of said grooves, a top plate carried by the side walls and slidable in certain other of said grooves, said end wall being adapted to retain said top plate in position, a top center section carried by the casing on said side walls, an entrance door carried by the casing, a top wall portion carried by the entrance door, said entrance door having a circular opening, a trap door, means swingingly connecting the trap door with the casing and between the walls thereof, said trap door being adapted to overlie the top wall section and the entrance door in closed position, said trap door having an arm terminating in a detent, a guard plate carried by the casing and limiting movement of the arm, a trigger plate carried by the casing and having a trigger engageable with the detent for retaining the trap door in a raised set position, and means carried by the trigger plate for adjusting the responsiveness of the trigger plate to depressive effort, said trigger plate being adapted to be depressed for releasing the detent from the trigger and permitting the trap door to swing to closed position whereby an animal depressing the trigger plate will be confined within the trap, said first mentioned end wall being removable for permitting access to the interior of the trap.

2. In an animal trap, a casing, means closing the casing at one end, said casing having a bottom wall and side walls, a plate overlying the bottom wall, a trigger plate having upstanding flanges, a rod extending through the trigger plate and swingingly mounting said trigger plate in the casing, an entrance door carried by the casing at its opposite end, and a trap door carried by the casing and having an arm terminating in a detent, said detent being adapted to engage the trigger plate whereby said trap door will be held in a raised set position, and circuit connections for said first mentioned plate and said trigger plate, said trigger plate being depressible by an animal for releasing the trap door for permitting closing of the entrance door and imprisoning the animal within the trap, an electric circuit being closed through the animal, the first mentioned plate and the trigger plate upon engagement of the trigger plate by the animal whereby said animal will be electrocuted.

3. In an animal trap, a casing, a plate carried by the casing, a trigger plate carried by the casing, circuit connections for the plate and trigger plate, and a trap door carried by the casing and having an arm terminating in a detent adapted for engagement with the trigger plate whereby said trap door will be held in a raised set position, engagement of the trigger plate by an animal in the casing simultaneously closing an electric circuit between the plates and a current source for electrocuting the animal and releasing the trap door for imprisoning the animal within the casing.

4. An animal trap including a casing having bottom and side walls, an end wall having an entrance door therein, a top wall portion carried by the casing and swingingly mounted between the side walls, said trap door having a reduced portion defining an arm terminating in a detent and being adapted to swing to closely confront the end wall and top portion for closing the entrance door when said trap door is in released position, a trigger plate carried by the side walls and having a trigger engageable by the detent for retaining the trap door in set position, said trigger plate being depressible by an animal for releasing the detent and permitting falling of the trap door for imprisoning an animal in the trap, and means closing the opposite end of the casing.

5. An animal trap including a casing, means closing the casing at one end, a top wall portion near one end of the top of the casing, an end wall at said end and having an entrance door, a trap door carried by the casing and pivotally mounted in said casing substantially medially of its length for swinging movement, said trap door having an arm terminating in a detent, and a trigger plate carried in the casing and engageable with the detent for retaining the trap door in a raised set position, said trigger plate being depressible by an animal in the trap for releasing the detent whereby the trap door will be released for closing confronting the top wall portion and the end wall and closing the entrance door whereby an animal in the trap will be imprisoned, said trigger plate being weighted for normally retaining it in operative position.

6. An animal trap including a casing having a bottom wall and side walls, means closing the casing at one end, an end wall carried at the opposite end of the casing and having an entrance door, a trap door having its substantially midportion pivotally connected with substantially the midportion of the casing for swinging movement with respect to the trap, said trap door having a reduced portion at one end defining an arm terminating in a detent, a trigger plate carried by the casing and having a trigger engageable with the detent for retaining the trap door in a raised set position, said trigger plate being depressible by an animal in the trap for freeing the detent and permitting swinging of the trap door to a closed position parallel to and in close spaced relation to the end wall and within the area of the casing for closing the entrance door whereby the animal will be imprisoned in the trap, and means carried by the casing automatically shiftable to a position for preventing upward swinging movement of the trap door after springing of the trap.

GROVER L. WINGFIELD.